United States Patent
Puyplat

[11] 3,931,511
[45] Jan. 6, 1976

[54] VEHICLE HEADLAMPS
[75] Inventor: Olivier Puyplat, Paris, France
[73] Assignee: Cibie Projecteurs, Bobigny, France
[22] Filed: Dec. 6, 1974
[21] Appl. No.: 530,328

[30] Foreign Application Priority Data
Dec. 12, 1973 France .............................. 73.44325

[52] U.S. Cl. ......... 240/41.3; 240/7.1 LJ; 240/41 R; 240/41.6
[51] Int. Cl.² ........................................ F21V 13/04
[58] Field of Search .............. 240/41.3, 41.25, 41.6, 240/41.61, 41.62, 106 R, 41 R, 41.35 R

[56] References Cited
UNITED STATES PATENTS
| | | | |
|---|---|---|---|
| 3,622,778 | 11/1971 | Cibie | 240/41.25 X |
| 3,849,642 | 11/1974 | Puyplat | 240/41.3 |
| 3,870,876 | 3/1975 | Puyplat | 240/41.6 X |

Primary Examiner—Richard L. Moses
Attorney, Agent, or Firm—Alan H. Levine

[57] ABSTRACT

A vehicle headlamp has a paraolic mirror with a lamp having a dipped beam filament disposed in front of the focus of the mirror. A front lens is adapted to be rigidly secured to the vehicle body whilst an auxiliary lens is mounted between the front lens and the lamp. The auxiliary lens is rigidly connected to the mirror so as to be movable therewith.

3 Claims, 5 Drawing Figures

VEHICLE HEADLAMPS

BACKGROUND OF THE INVENTION

This invention relates to vehicle headlamps. The Applicant's U.S. Ser. No. 3,849,642 issued on Nov. 19, 1974 to Olivier PUYPLAT relates to a motor vehicle headlamp comprising a parabolic mirror, a lamp having a dipped beam filament disposed in front of the focus of the mirror, the mirror having a central part immediately surrounding the lamp and a peripheral part surrounding the central part, a front lens provided whith relief patterns to intercept and disperse at least a part of the reflected dipped beam, and an auxiliary lens positioned between the lamp and the front lens and provided with relief patterns to intercept and disperse at least that part of the dipped beam which is reflected by the central part of the parabolic mirror.

It is disclosed in the U.S. patent referred to above that the front lens and the auxiliary lens are both rigidly connected to the mirror or to the mirror support so as to form an optical unit which can be introduced into a vehicle body.

The proposed function of the front lens of the system described above is to engage closely with the shape of the vehicle body so as to prevent a break of styling lines such as would occur if conventional headlamps were used since a break of this kind is bound to impair the aesthetics and streamlining of the body. However, in the case of body shapes which are very inclined to the headlamp optical axis, the optical system embodied by the front lens, auxiliary lens and mirror tends to become of substantial size and weight so that it is difficult to secure or mount the unit on the body. The problems are even greater if it is desired to introduce mechanism for compensating the horizontal inclination of the reflector axis in dependence inter alia on vehicle attitude since compensation of this kind leads to considerable movement of the optical system. Also the bulk and weight of the optical system causes difficulties in the construction of compensating systems since these must allow for the inertia and considerable overhang of the unit and the weight of the front lens and of the air pressure acting thereon.

SUMMARY OF THE INVENTION

According to the present invention a vehicle headlamp comprises a parabolic mirror, a lamp having a dipped beam filament disposed in front of the focus of the mirror, see page 2, a front lens provided with relief patterns to intercept and disperse at least a part of the reflected dipped beam, an auxiliary lens positioned between the lamp and the front lens and provided with relief patterns to intercept and disperse at least a part of the light reflected by the central part of the mirror, the front lens being adapted to be rigidly connected to the vehicle and the auxiliary lens being rigidly connected to the mirror so as to be movable therewith.

Specifically in the headlamp according to the invention the front lens may be rigidly connected to the vehicle and the auxiliary lens is rigidly connected to the reflector so as to be movable therewith by any known adjustment means in dependence inter alia upon vehicle attitude.

Clearly, if this feature is used, an appropriate distribution of relief patterns on the lens can help to provide a headlamp whose front lens can be fixed in position but whose photometry remains satisfactory despite relatively large angular movements of the parabolic mirror. The inertia of the moving system embodied by the mirror and the auxiliary lens remains low, thus simplifying problems connected with the construction of the automatic compensator if it is required to correct headlamp tilt, inter alia in dependence upon vehicle attitude. Also the fixed mounting of the front lens simplifies the problems of securing into the bodywork, removes the elements of the compensating device, if provided, from the effects of air pressure and moreover facilitates the possible fitting of a headlamp wiper or the like.

In one specific embodiment the lamp has in addition a main beam filament disposed near the focus of the mirror and the auxiliary lens has two lower side zones having relatively slight relief patterns for the dipped beam range, and a central zone having more marked relief patterns and serving mainly to provide the major width of the dipped beam and of the main beam, and the front lens having two top lateral zones formed with relatively slight relief patterns and serving mainly to provide the intermediate width of the two beams.

Alternatively the headlamp may be provided with a secondary parabolic mirror having its own lamp and disposed inside the first named mirror to form a main beam, the auxiliary lens having two lateral zones having relatively slight relief patterns to provide the dipped beam range and a top central zone having more marked relief patterns to provide the major width of the dipped beam, and the front lens having two top lateral zones providing the intermediate width of the dipped beam and two lower lateral zones serving mainly to control the long-range illumination of the main beam, the width thereof being controlled by one of the bottom central zone of the auxiliary lens and the bottom central zone of the front lens.

DESCRIPTION OF THE DRAWINGS

The invention may be carried into practice in various ways but two specific embodiments will now be described by way of example with reference to the accompanying drawings, in which.

DESCRIPTION OF THE PREFERRED EMBODIMENTS

Figure 1:
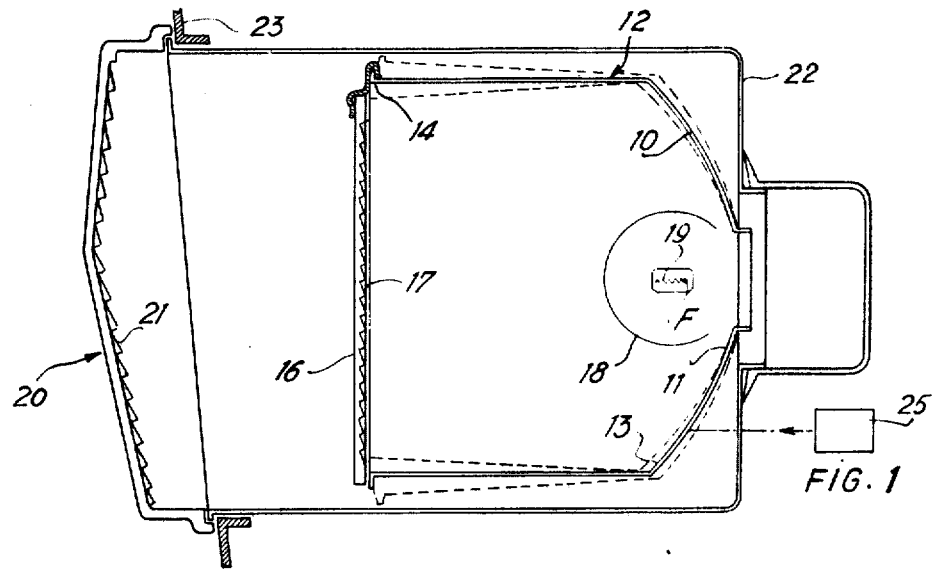
FIG. 1 is a diagrammatic sectional side elevation of a motor vehicle headlamp according to the present invention.
Figure 2:
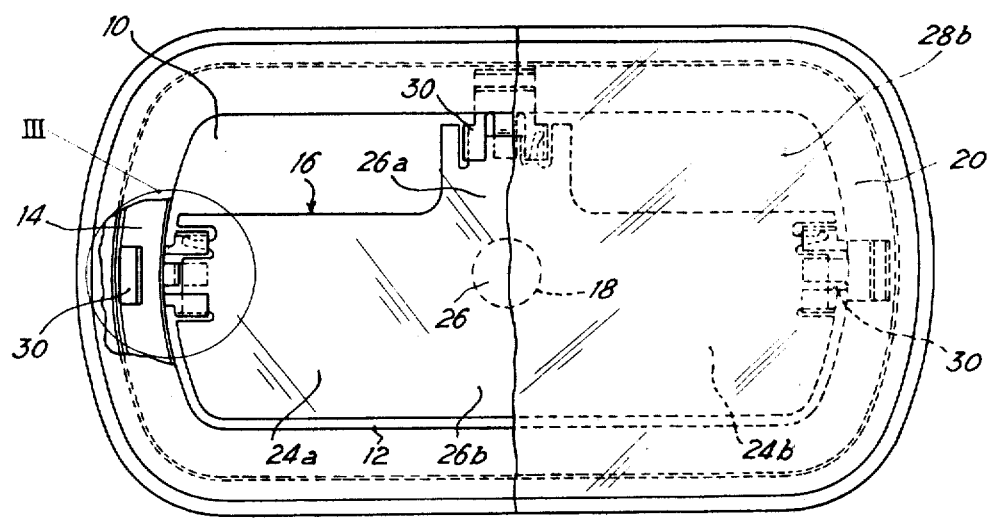
FIG. 2 is a front elevation with certain parts broken away of the headlamp of FIG. 1.
Figure 3:
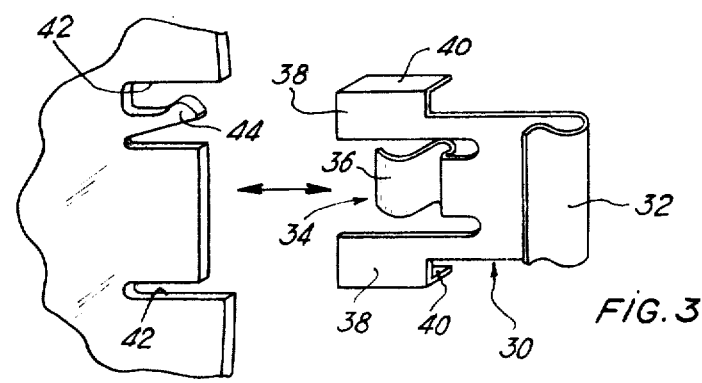
FIG. 3 is an exploded perspective view of part of the system shown at III in FIG. 2.

Referring firstly to FIGS. 1 to 3, a parabolic mirror 10 is rigidly secured to a metal support member or frame 12 and is provided with a central part 11 surrounded by a peripheral part 13. In the form shown the mirror surface is provided by the application of an appropriate reflecting substance on the concave inside surface of the member 12. However, it is to be understood that the mirror 10 can, of course, be independent and may, for example, be provided by a reflecting surface on a rigid injection moulded body and can be secured to the member 12 by any appropriate means. The forwardly facing open end 14 of the member 12 is provided with an auxiliary lens 16 advantageously made of transparent plastics material which has on its inside surface at least one system of grooves or similar relief patterns 17 adapted to provide a predetermined dispersion of at least a part of the light beam reflected by the central part 11 of the mirror and generated by the dipped beam filament 19 of a lamp 18 which filament is positioned appropriately on the optical axis of the mirror 10 in front of the focus F thereof. The detail of the lens 16 will be described shortly.

The headlamp also comprises a front lens 10 which has on its inside surface at least one system of grooves or similar relief patterns 21 for providing a predetermined dispersion of at least a part of the light beam emitted by the filament 19 and reflected by the mirror 10. In the example shown in FIG. 1 the lamp 18 is a twin filament lamp, one filament 19 being disposed in front of the focus F of the mirror 10 and serving to produce a dipped beam while the other filament (not being shown in the drawings) is disposed near the focus and provides the main beam.

The front lens 20 is adapted to be rigidly secured to the vehicle bodywork 23 by any appropriate means (not shown), whilst the auxiliary lens 16 is rigidly secured to the mirror 10 so as, where applicable, to be movable therewith by any known automatic or manual adjusting means 25. In particular the orientation of the axis of the mirror 10 can be controlled by the appropriate compensating means 25 to the positions shown by the dotted lines in FIG. 1, for instance in dependence on vehicle attitude or in dependence on the orientation of the steering wheels (not shown) of the vehicle.

In the construction shown in FIG. 1 the front lens 20 is hermetically sealed to a metal shell or housing 22 adapted to be fitted to the bodywork 23 of the vehicle so that the optical system embodied by the lens 20 and the moving member 12 form a unitary device. Alternatively, however, the front lens 20 can be completely independent of the member 12 and can be directly secured to the peripheral edge of an aperture in the vehicle body receiving the vehicle headlamp. In this case the member 12 is adapted to be moved inter alia angularly in accordance with the intended control.

If there is to be no impairment of the photometry of the resulting headlamp, notwithstanding movements of the member 12 relatively to the front lens 20, the light distributing and dispersing grooves 17 – 21 must be carefully distributed between the fixed lens 20 and the movable auxiliary lens 16. Preferably the grooved zones used to produce the cut-off of the dipped beam and the grooves, where there is considerable dispersion of the light flux of the two beams, i.e. the dipped beam and the main beam, are associated with the auxiliary lens 16.

FIG. 2 shows one example of how the grooves can be distributed between the two lenses 16 and 20. In this example the lens 16 has two lower lateral zones 24a and 24b formed with slight grooving to produce the long-range effect; in other words that part of the beam which provides long-range illumination, of the light reflected by the mirror 10, such light forming the dipped beam of the headlamp. The lens 16 also has a central zone 26 whith more marked grooves (prisms or similar reliefs) the top part 26a of the zone 26 producing the major width or, in other words, that part of the beam providing very short-range illumination of the road, of both the dipped and main beams. In contrast the lower part 26b of the central zone 26 produces the major width of the main beam.

Referring to the right-hand side of FIG. 2, the front lens 20 has two top lateral zones 28b of which one is shown, which have slight grooving which is responsible mainly for the intermediate width, in other words that part of the beam providing medium-range illumination of the road of the two beams produced by the lamp 18.

FIG. 3 shows one example of a mounting facility used for securing the auxiliary lens 16 to the flanged edge 14 of the member 12. Three of these facilities are used for this purpose in the embodiment shown in FIGS. 1 and 2. Each facility mainly comprises a metal clip 30, shown in FIG. 3, having at one end a bent edge 32 adapted to abut the flange 14 of the member 12. At its other end the clip 20 has a gripping member 34 provided with a central resilient finger 36 adapted to grip the corresponding edge of the auxiliary lens 16. Two other fingers 38 have bent edges 40 which cooperate with appropriately shaped slots 42 in the lens 16 to obviate any risk of tangential movement between the lens 16 and the member 34. Also a finger 44 can, as shown in FIG. 3, be provided on the lens 16 near a slot 42 in order to take up an dimensional differences or expansions occuring between the edges 40 and the slots 42.

Figure 4:
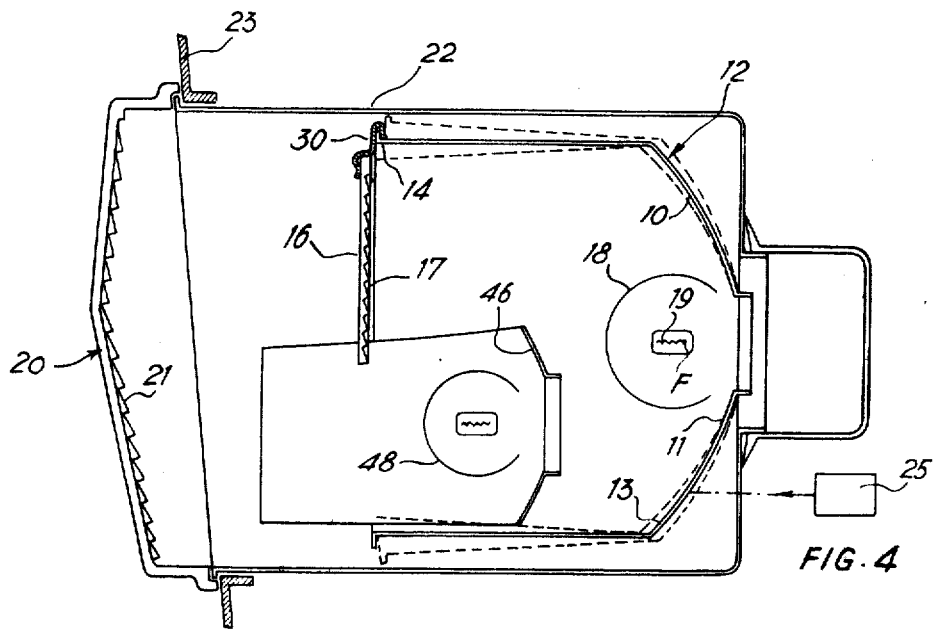
FIG. 4 is a diagrammatic sectional side elevation of an alternative embodiment.
Figure 5:
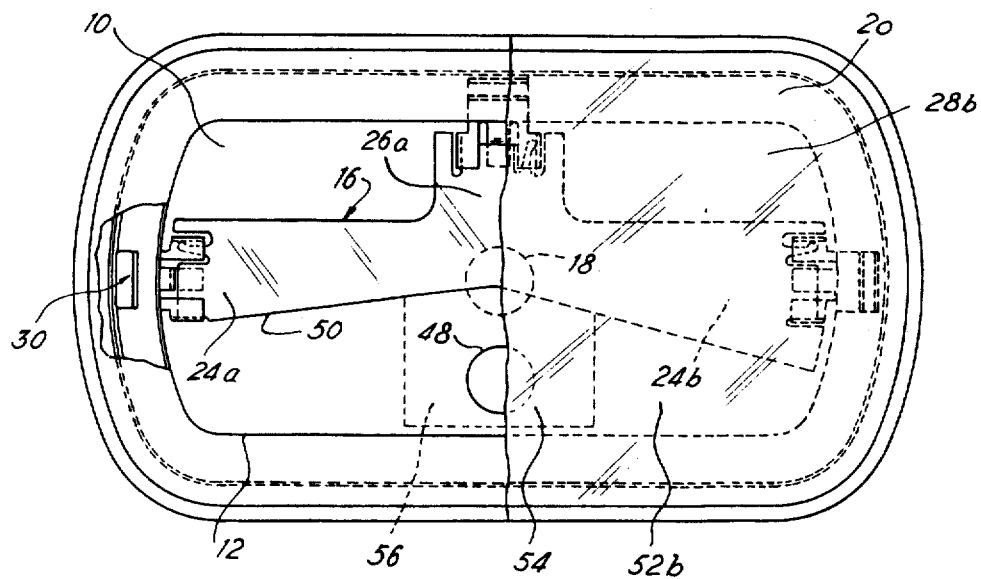
FIG. 5 is a view similar to FIG. 2 of the second embodiment.

FIGS. 4 and 5 show a second embodiment basically similar to the one described and like references denote like elements as used in FIGS. 1 to 3. The main difference between the two embodiments arises from the use, in the second embodiment, of a secondary parabolic mirror 46 with which is associated a main beam lamp 48. The mirror 46 is placed inside the support member 12 for the mirror 10 and the lamp 18 in this case has only a single filament (i.e. filament 19) to form simply the dipped beam in cooperation with the mirror 10.

In this embodiment the auxiliary lens 16 can do no more than disperse at least a part of the dipped beam, the function of the front lens 20 being to define the appropriate dispersion of the main beam and to supplement the dispersion of the dipped beam. FIG. 5 shows front elevations of the lenses 16 and 20. The auxiliary lens 16 has two lateral portions 24a and 24b formed with relatively slight grooving to provide long-range illumination provided by the dipped beam. A top central portion 26a has more marked grooving and is reponsible for dipped beam width. The lower edge of the auxiliary lens 16 participates in producing the dipped beam cut-off whilst the front lens 20 has two finely grooved lateral zones of which one is shown at 28b and which are responsible for producing the intermediate width of the dipped beam. The lens 20 also has two bottom lateral zones, of which one is shown at 52b, which are responsible for producing the long-range illumination of the main beam emitted by the lamp 48 and reflected by the mirror 46. The main beam width can be controlled either by the bottom central section 54 of the front lens 20, as shown, or by an extension 56 shown in chain lines of the auxiliary lens 16.

What we claim as our invention and desire to secure by Letters Patent is:

1. A motor vehicle headlamp comprising an parabolic mirror, a lamp having a dipped beam filament disposed in front of the focus of the mirror, the mirror having a central part surrounding the lamp and a peripheral part surrounding the central part, a front lens provided with relief patterns to intercept and disperse at least a part of the reflected dipped beam, an auxiliary lens positioned between the lamp and the front lens and provided with relief patterns to intercept and disperse at least a part of the light reflected by the central part of the mirror, the front lens being rigidly connectable to the vehicle and the auxiliary lens being rigidly connected to the mirror so as to be movable therewith.

2. A headlamp as claimed in claim 1 in which the lamp has in addition a main beam filament disposed near the focus of the mirror and the auxiliary lens has two lower side zones having relatively slight relief patterns for the dipped beam range, and a central zone having more marked relief patterns and serving mainly to provide the major width of the dipped beam and of the main beam, and the front lens having two top lateral zones formed with relatively slight relief patterns and serving mainly to provide the intermediate width of the two beams.

3. A headlamp as claimed in claim 1 and comprising a secondary parabolic mirror having its own lamp and disposed inside the first named mirror to form a main beam, the auxiliary lens having two lateral zones having relatively slight relief patterns to provide the dipped beam range and a top central zone having more marked relief patterns to provide the major width of the dipped beam, and the front lens having two top lateral zones providing the intermediate width of the dipped beam and two lower lateral zones serving mainly to control the long-range illumination of the main beam, the width thereof being controlled by one of the bottom central zone of the auxiliary lens and the bottom central zone of the front lens.

* * * * *